United States Patent [19]

Sheer

[11] Patent Number: 4,944,975

[45] Date of Patent: Jul. 31, 1990

[54] COMPOSITE COIL FORMS FOR ELECTRICAL SYSTEMS

[75] Inventor: M. Lana Sheer, Chadds Ford, Pa.

[73] Assignee: E. I. Du Pont de Nemours and Company, Wilmington, Del.

[21] Appl. No.: 251,773

[22] Filed: Oct. 3, 1988

[51] Int. Cl.[5] .......................... B32B 5/08; B32B 5/16; H01F 27/302

[52] U.S. Cl. .................................. 428/36.1; 336/198; 336/208; 428/34.5; 428/36.2; 428/36.3; 428/290; 428/297; 428/401; 428/417; 428/474.7; 428/473.5; 428/902; 428/920

[58] Field of Search .................... 428/36.1, 36.2, 36.4, 428/34.5, 290, 401, 297, 902, 920, 417, 474.7, 473.5; 336/198, 208

[56] References Cited

U.S. PATENT DOCUMENTS

| | | | |
|---|---|---|---|
| 3,833,182 | 9/1974 | Wilcox et al. | 242/181.1 |
| 4,076,869 | 2/1978 | Flynn | 428/417 |
| 4,375,527 | 3/1983 | Zahner | 428/417 |
| 4,421,806 | 12/1983 | Marks et al. | 428/36.3 |
| 4,429,294 | 1/1984 | Meffert et al. | 336/208 |
| 4,492,779 | 1/1985 | Junior et al. | 428/423.1 |
| 4,504,532 | 3/1985 | Herring | 428/36.4 |
| 4,532,275 | 7/1985 | Aito et al. | 428/474.4 |
| 4,579,773 | 4/1988 | Cole et al. | 428/474.4 |
| 4,595,616 | 6/1986 | Bell et al. | 428/68 |
| 4,595,620 | 6/1986 | Dighton et al. | 428/36.4 |
| 4,608,300 | 8/1986 | Gruber | 428/417 |
| 4,663,225 | 5/1987 | Farley et al. | 428/36.1 |
| 4,701,735 | 10/1987 | Hill et al. | 336/205 |
| 4,734,321 | 3/1988 | Radvan et al. | 428/297 |
| 4,814,222 | 3/1989 | Davis et al. | 428/920 |
| 4,826,724 | 5/1989 | Bainbridge et al. | 428/920 |

OTHER PUBLICATIONS

UL Standard .1446 Testing & Rating, Underwriters Laboratories Inc. 1st Ed Jun. 27, 1978, pp. 3-15.

*Primary Examiner*—Ellis P. Robinson
*Assistant Examiner*—Archene Turner

[57] ABSTRACT

An electrical coil form having a UL 1446 rating greater than 200° C. is formed from either a thermoplastic or thermosetting resin material reinforced with continuous or long chopped or stretch broken aramid or glass fibers or aramid paper.

1 Claim, 1 Drawing Sheet

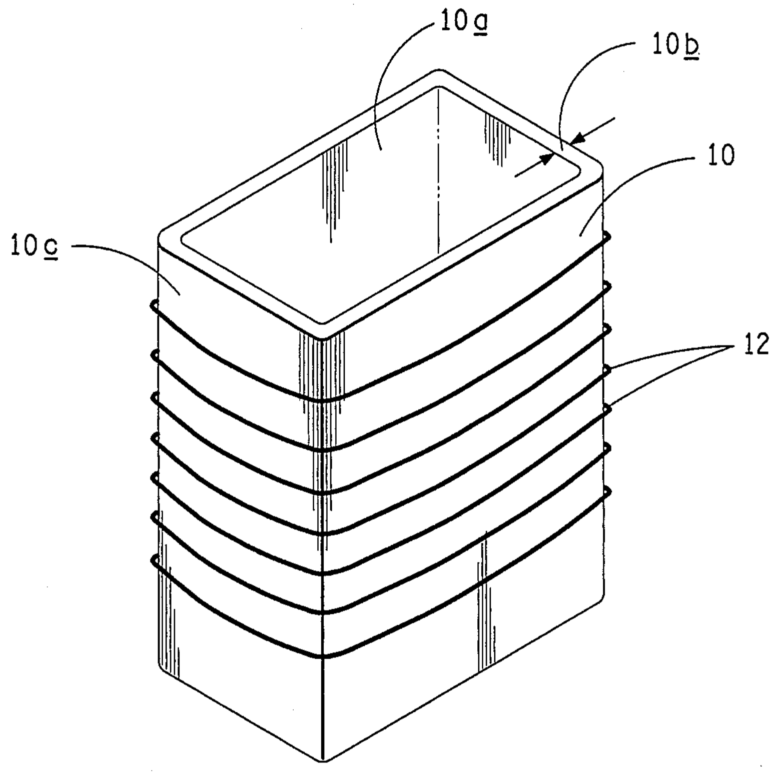
10a
10b
10
10c
12

COMPOSITE COIL FORMS FOR ELECTRICAL SYSTEMS

BACKGROUND OF THE INVENTION

This invention relates to electrical device coil forms and, more particularly, it relates to a coil form produced from fiber reinforced resin material.

The market segment for electrical devices such as for windings of motors, transformers and solenoids is increasingly moving to miniaturization of such devices. This in turn leads to a rise in internal equipment operating temperature resulting in a need for higher temperature ratings on insulation materials used for these applications.

Coil forms fashioned from Nomex ® aramid paper, a high temperature resistant paper with excellent physical and electrical properties are known for use in high temprature (greater than 200° C. rating of UL Standard 1446) wherein a coil of wire is wound over the Nomex ® paper coil form placed on a mandrel to support the form. However, this product does not exhibit a high degree of structural strength and the wire coil must be wound fairly loosely over the Nomex ® paper coil form or the Nomex ® will implode after the wire windings are in place and the winding mandrel is removed. The use of this coil form system is labor intensive, requires more wire than necessary and provides lower transformer efficiency.

Insulation systems approved to UL Standard 1446 are rated by subjecting them to cycles of thermal aging, low temperature shock, humidity and vibration. At the end of each cycle the systems are checked at 600 volts for short circuits, with the cycle being repeated until the insulation breaks down. Test voltages may be higher for systems with higher operating voltages. The temperature rating assigned to an insulation system will depend on the service life of the equipment at different aging temperatures.

SUMMARY OF THE INVENTION

In order to overcome the above-noted deficiencies, a coil form has been developed which has high structural stability at a UL Standard 1446 rating of greater than 200° C. and comprises a structure of fiber reinforced resin matrix material having longitudinal passage therethrough. The outer peripheral surface of the structure forming a support for a wire coil wound thereon.

Suitable materials which may be used as the resin matrix include electrically insulating thermoplastic or thermoset resins such as polyethylene terephthalate, 6,6-nylon or electrical grade epoxy.

The resin of choice is reinforced with fibers such as, for example, glass and aramid fibers which may be continuous, long fiber discontinuous such as chopped or randomly broken, but in any event greater than ¼" in length. The fiber volumes preferably are in the range of from about 15 to about 70% and more preferably in the range of from 20 to 50%. The coil forms can be made by any known process for making such forms as by braiding and filament winding of resin coated materials or by pultrusion methods or indeed by hand lay-up techniques well known in the art.

Another preferred embodiment is an aramid prepreg based on an electrically insulating resin.

BRIEF DESCRIPTION OF THE DRAWING

The drawing illustrates a perspective view of a coil form of the invention having wire wound on its surface in the form of a coil.

DETAILED DESCRIPTION OF THE PREFERRED EMBODIMENT

The drawing represents a specific coil form of the invention for purposes of illustration and includes an elongated thin-walled structure 10 defining a passage 10*a* therethrough. The wall thickness is designated 10*b*. The outer peripheral surface 10*c* of the structure 10 forms a support for a wire coil 12 wound thereon.

EXAMPLE 1

In a compression molding process, a polyimide release film is placed in the steel mold having a 20 mil shim plate. On this release film 4.5 gm of pre-dried flame retarded polyethylene terephthatlente polymer pellets are spread which are then alternately covered by 6-plies of style S-120 fiber glass woven fabric weighing 39 gm. The pellet-fabric sandwich structure is built successively until all of the 27 gm of the polymer has been used. A polyimide release film is placed on the top layer and mold is closed. Next, the molding is carried out according to the following time-temperature cycle:

The mold was inserted into the press at 310° C. and held for 25 min (platens touching) under contact pressure, then held at 15 min at 50 psi, then held at 15 min at 250 psi and cooled under pressure.

A molded panel, made according to the procedure outlined above, had a void-content, as measured by C-Scan, of less than 5% indicating good consolidation. A sample of the panel was tested in accordance with UL Standard for Safety 1446, analyzed at Underwriters Laboratories, Inc. and received a Provisional Recognition as a Class R (220° C.) motor or transformer insulation.

EXAMPLE 2

In Example 2 the fiber-glass fabric/thermoplastic polymer is replaced with a prepreg consisting of 4-plies of B-staged epoxy impregnated aramid paper. The paper was made from 85/15 Kevlar ®/Nomex ® aramid fibers (about ¼" long) on a standard wet-lay papermaking machine. The following molding cycle is used:

2 hrs at 190° C. and 250 psi cool to room temperature under pressure

A molded panel, made according to the procedure outlined above, had a void content, as measured by C-Scan, of less than 5%, indicating good consolidation. A sample of the panel was tested in accordance with UL Standard for Safety 1446, analyzed at Underwriters Laboratories, Inc. and received a Provisional Recognition as a Class R (220°) motor or transformer insulation.

What is claimed is:

1. A coil form for an electrical device comprising:

a structure of an aramid prepreg impregnated with an electrically insulating resin, said structure having a longitudinal passage therethrough, a continuous outer peripheral surface forming support for a coil wound thereon and structural stability and a UL Standard 1446 rating of greater than 200° C., said aramid prepreg having fibers greater than ¼ inch in length, said aramid prepreg being an aramid paper which is a blend of Kevlar ® aramid and a Nomex ® aramid in an 85% to 15% by weight ratio, respectively.

* * * * *